3,117,479
DEVICE FOR TESTING A PINHOLE DETECTOR
James J. Bisbis, Hobart, Ind., assignor to United States
Steel Corporation, a corporation of New Jersey
Filed May 22, 1959, Ser. No. 815,133
6 Claims. (Cl. 83—308)

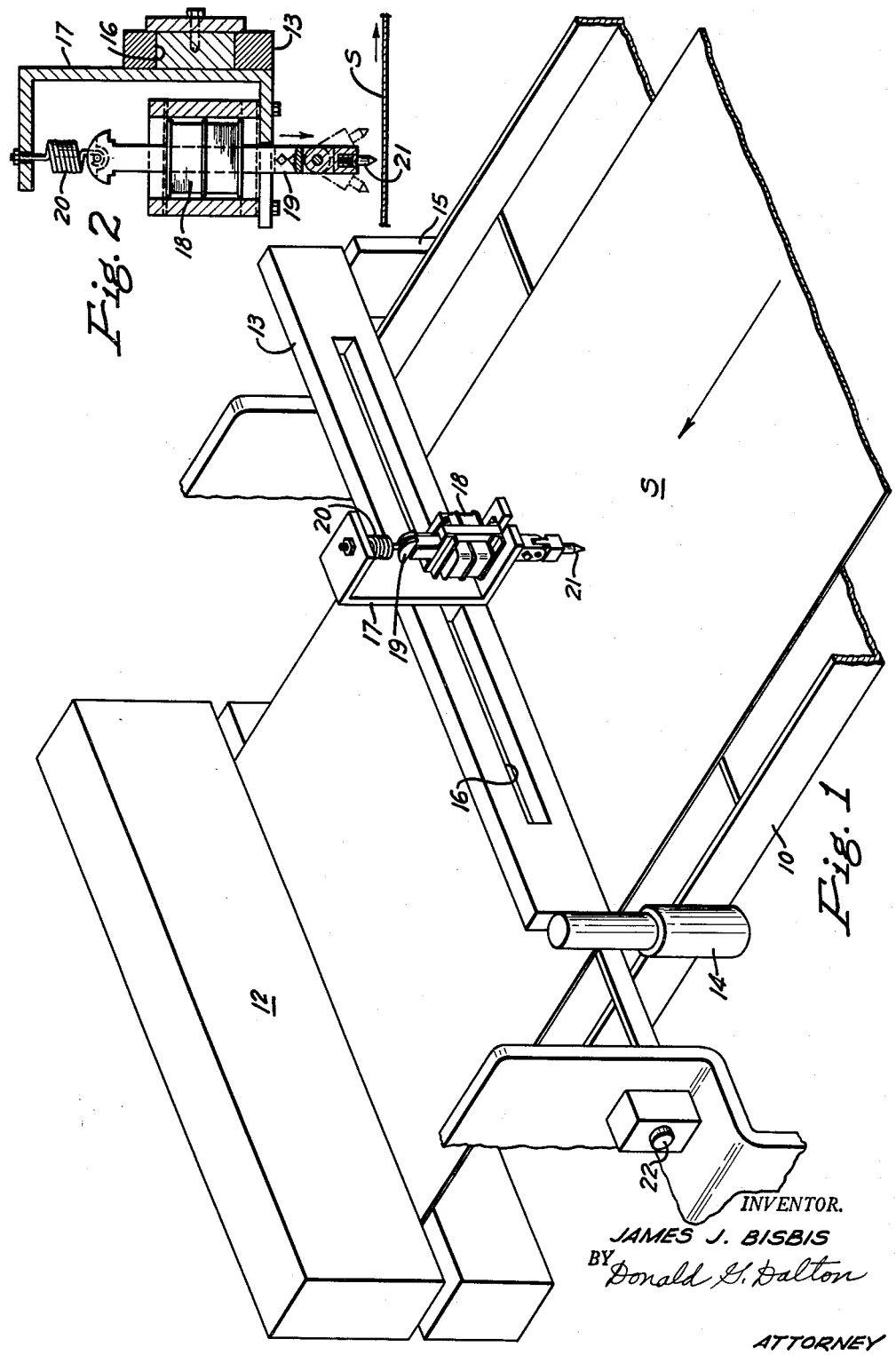

This invention relates to a device for testing the operation of a pinhole detector on a sheet classifying line.

A conventional line for classifying metal sheets includes a light-sensitive pinhole detector which scans moving continuous strip before it is sheared into sheets. This detector is connected with a suitable circuit for recording the location of pinholes found in the strip. A conveyor carries the sheets away from the shear and past a deflector. The circuit is connected with the deflector and includes suitable time delay means for operating the deflector at the proper moment to throw out sheets containing pinholes.

An object of the present invention is to provide a simple device for mechanically punching occasional small clean perforations in strip ahead of a pinhole detector to test the detector as to whether it is operating properly.

A more specific object is to provide, in combination with a pinhole detector and a sheet classifying line, a testing device which includes a punch supported for limited movement with the strip and an operating solenoid, whereby occassional small clean perforations can be placed in the strip to determine whether the detector is operating properly.

In accomplishing these and other objects of the invention, I have provided improved details of structure, a preferred form of which is shown in the accompanying drawing, in which:

FIGURE 1 is a diagrammatic perspective view of a portion of a sheet classifying line equipped with a testing device constructed in accordance with my invention; and FIGURE 2 is a vertical section through the testing device.

The drawing shows a portion of a conventional sheet classifying line which includes a frame 10 and a light-sensitive pinhole detector 12. Rapidly moving continuous metal strip S passes through the detector in the direction indicated in FIGURE 1. Subsequently the strip passes a shear and deflector, as already described. Since these parts are conventional and are not involved in my invention, I have not shown them in the interest of simplicity.

In accordance with the present invention, a beam 13 is supported on a pivotal mounting 14 at one side of frame 10. The beam is adapted to span the frame overlying the strip ahead of the pinhole detector, as illustrated, or to swing about its mounting to an out-of-the-way position along the side of the frame. When the beam spans the frame, its free end rests on a block 15 fixed to the opposite side of the frame from the mounting 14. The beam contains a lengthwise slot 16 in which a C-shaped bracket 17 is supported for sliding adjustment along the length of the beam. The bracket supports a solenoid 18 which contains a vertically movable plunger 19. A spring 20 suspends the plunger from the upper flange of the bracket and thus holds the plunger in a raised position as long as the solenoid is deenergized. A sharp-pointed punch 21 is pivoted to the bottom of the plunger on a horizontal axis parallel with the length of beam 13. The punch clears the strip as long as the plunger remains raised. A push button switch 22 for completing a circuit to the solenoid is mounted at any suitable location, as on one side of frame 10.

When it is desired to test the pinhole detector 12, beam 13 is swung about its pivotal mounting 14 to the position illustrated. Push button 22 is momentarily depressed to energize solenoid 18 and thereby force plunger 19 downwardly against the action of spring 20, whereupon punch 21 perforates strip S. The push button is quickly released to raise the plunger and punch, but the pivotal mounting of the punch on the plunger enables the punch to move with the strip sufficiently to leave a small clean perforation without tearing the strip. The slidable mounting of bracket 17 enables perforations to be made at various locations across the width of the strip and thus test sensitivity of all portions of the pinhole detector. After the strip is perforated, it is a simple matter to determine whether the classifier throws out the sheet in which the perforation appears.

From the foregoing description it is seen that my invention affords a simple reliable means for placing small clean perforations in a strip to test a pinhole detector. Since the punch engages the strip only momentarily and can travel therewith, there is little possibility of tearing the strip or otherwise interfering with operation of the line. The invention also eliminates the hazards of manually punching a strip to test a pinhole detector.

While I have shown and described only a single embodiment of my invention, it is apparent that modifications may arise. Therefore, I do not wish to be limited to the disclosure set forth but only by the scope of the appended claims.

I claim:

1. The combination, with a sheet classifying line which includes a frame and a pinhole detector mounted on said frame for scanning moving continuous strip before it is sheared into sheets, of a device for testing said pinhole detector comprising a punch, means supporting said punch over the strip ahead of said pinhole detector, and means for momentarily actuating said punch to perforate the strip, said punch having limited movement with the strip to leave a small clean perforation therein.

2. The combination, with a sheet classifying line which includes a frame and a pinhole detector mounted on said frame for scanning moving continuous strip before it is sheared into sheets, of a device for testing said pinhole detector comprising a beam supported on said frame and adapted to overlie the strip ahead of said pinhole detector, a punch supported on said beam for vertical movement with respect thereto, and means supported on said beam for momentarily actuating said punch to perforate the strip, said punch having limited movement with the strip to leave a small clean perforation therein.

3. The combination, with a sheet classifying line which includes a frame and a pinhole detector mounted on said frame for scanning moving continuous strip before it is sheared into sheets, of a device for testing said pinhole detector comprising a beam supported on said frame and adapted to overlie the strip ahead of said pinhole detector, a bracket mounted on said beam, a solenoid mounted on said bracket, a vertically movable plunger in said solenoid, a punch pivoted to the lower end of said plunger on a horizontal axis parallel to the length of said beam, a spring normally holding said plunger in a raised position in which said punch clears the strip, and means for momentarily energizing said solenoid to lower the plunger and punch and thus perforate the strip, pivotal movement of said punch enabling it to have limited movement with the strip to leave a small clean perforation therein.

4. A combination as defined in claim 3 in which said beam is pivoted to one side of said frame to enable it to be moved to an out-of-the-way position when not in use.

5. A combination as defined in claim 3 in which said bracket is adjustably mounted on said beam to enable the strip to be perforated at different locations across its width to test different portions of the pinhole detector.

6. In a sheet classifying line which includes a frame and a pinhole detector mounted on said frame for scanning moving continuous strip before it is sheared into sheets, the combination therewith of a device for determining whether the pinhole detector is working properly comprising a beam supported on said frame ahead of the entry side of said pinhole detector and adapted to overlie the strip, a bracket mounted on said beam and being adjustable along the length thereof, a solenoid mounted on said bracket, a vertically movable plunger in said solenoid, a punch pivoted to the lower end of said plunger on a horizontal axis transverse to the direction of strip travel, a spring normally holding said plunger in a raised position in which said punch clears the strip, and means for momentarily energizing the solenoid to lower the plunger and punch and thus perforate the strip, pivotal movement of said punch enabling it to have limited movement with the strip to leave a small clean perforation therein which simulates an actual pinhole, adjustment of said bracket along the length of the beam enabling said punch to perforate the strip at different locations across the width.

References Cited in the file of this patent

UNITED STATES PATENTS

| | | |
|---|---|---|
| 612,946 | Hotchkiss | Oct. 25, 1898 |
| 1,090,388 | Foote | Mar. 17, 1914 |
| 1,138,804 | Simmen | May 11, 1915 |
| 1,494,593 | Depue | May 20, 1924 |
| 2,342,474 | Klein | Feb. 22, 1944 |
| 2,618,335 | Price | Nov. 18, 1952 |
| 2,623,587 | Hervey | Dec. 30, 1952 |
| 2,660,133 | Anetsberger | Nov. 24, 1953 |
| 2,871,940 | Meunier | Feb. 3, 1959 |
| 2,946,381 | Lisinski | July 26, 1960 |
| 2,950,640 | Camp | Aug. 30, 1960 |

FOREIGN PATENTS

| | | |
|---|---|---|
| 705,398 | France | June 5, 1931 |